Figure 1:
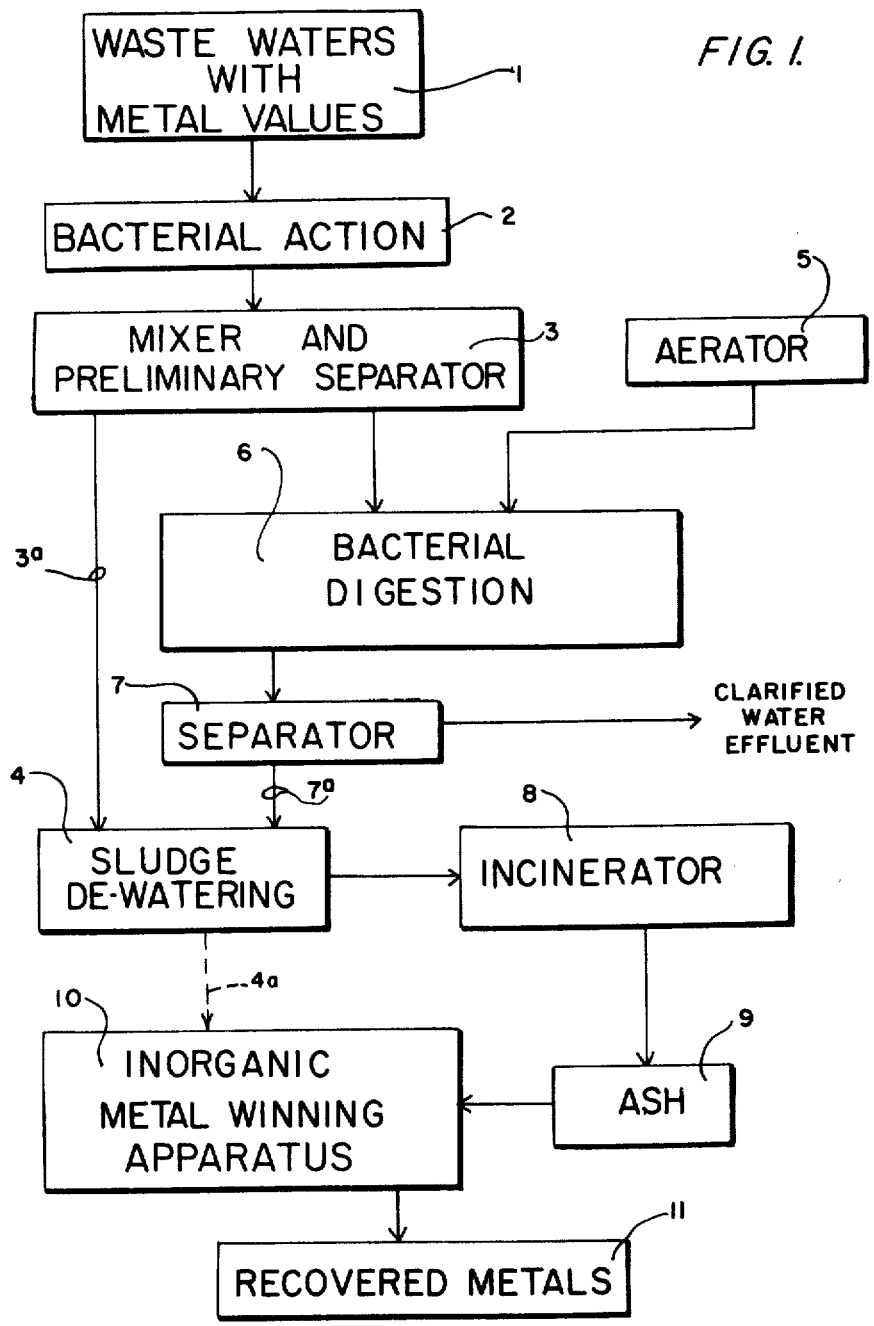

United States Patent [19]

Markels, Jr.

[11] 4,033,763
[45] July 5, 1977

[54] PROCESS FOR RECOVERY OF SELECTED METAL VALUES FROM WASTE WATERS

[75] Inventor: Michael Markels, Jr., Springfield, Va.

[73] Assignee: World Resources Company, McLean, Va.

[22] Filed: Nov. 22, 1976

[21] Appl. No.: 743,745

Related U.S. Application Data

[63] Continuation-in-part of Ser. No. 622,783, Oct. 15, 1975, abandoned.

[52] U.S. Cl. .................. 75/97 R; 75/74; 75/77; 75/78; 75/79; 75/83; 75/117; 75/118 R; 75/103; 210/15; 44/10 R; 204/109; 204/149

[51] Int. Cl.² .................. C22B 15/00; C22B 11/08

[58] Field of Search .......... 75/74, 79, 78, 77, 97, 75/103, 83, 118 R, 117; 210/15; 44/10 R; 204/149, 109

[56] References Cited

UNITED STATES PATENTS

| 63,492 | 4/1867 | Flach | 75/79 X |
|---|---|---|---|
| 515,164 | 2/1894 | Petraens | 75/79 |
| 2,478,652 | 8/1949 | Byler et al. | 75/118 R X |
| 2,777,764 | 1/1957 | Hedley et al. | 75/105 |
| 2,927,017 | 3/1960 | Marvin | 75/118 R |
| 3,272,621 | 9/1966 | Zajic | 75/101 R |
| 3,516,818 | 6/1970 | O'Neill et al. | 75/74 X |
| 3,537,986 | 11/1970 | Watanabe et al. | 210/15 |
| 3,796,568 | 3/1974 | Szekely et al. | 75/74 |
| 3,819,363 | 6/1974 | Wanzenberg | 75/118 R |

FOREIGN PATENTS OR APPLICATIONS

1,396,205  6/1975  United Kingdom ............ 75/5

OTHER PUBLICATIONS

Hofman, *Metallurgy of Lead*, McGraw-Hill Book Co., N.Y., 1918, pp. 494–497.

*Primary Examiner*—G. Ozaki
*Attorney, Agent, or Firm*—Dowell & Dowell

[57] ABSTRACT

A process for economically recovering metal values, especially precious metal values, from waste waters comprising a mixture of natural surface water, industrial waste water and organic waste, where the metal values appear in concentrations below levels previously commercially of interest, including the steps of concentrating the metal values of the waste waters by bacterial treatment thereof to imbibe and capture the metal values from the waters and immobilize them in a sludge, coagulating and separating the sludge from the water, de-watering the sludge and burning off the organic matter, and recovering selected metal values by inorganic metal-winning process steps.

16 Claims, 2 Drawing Figures

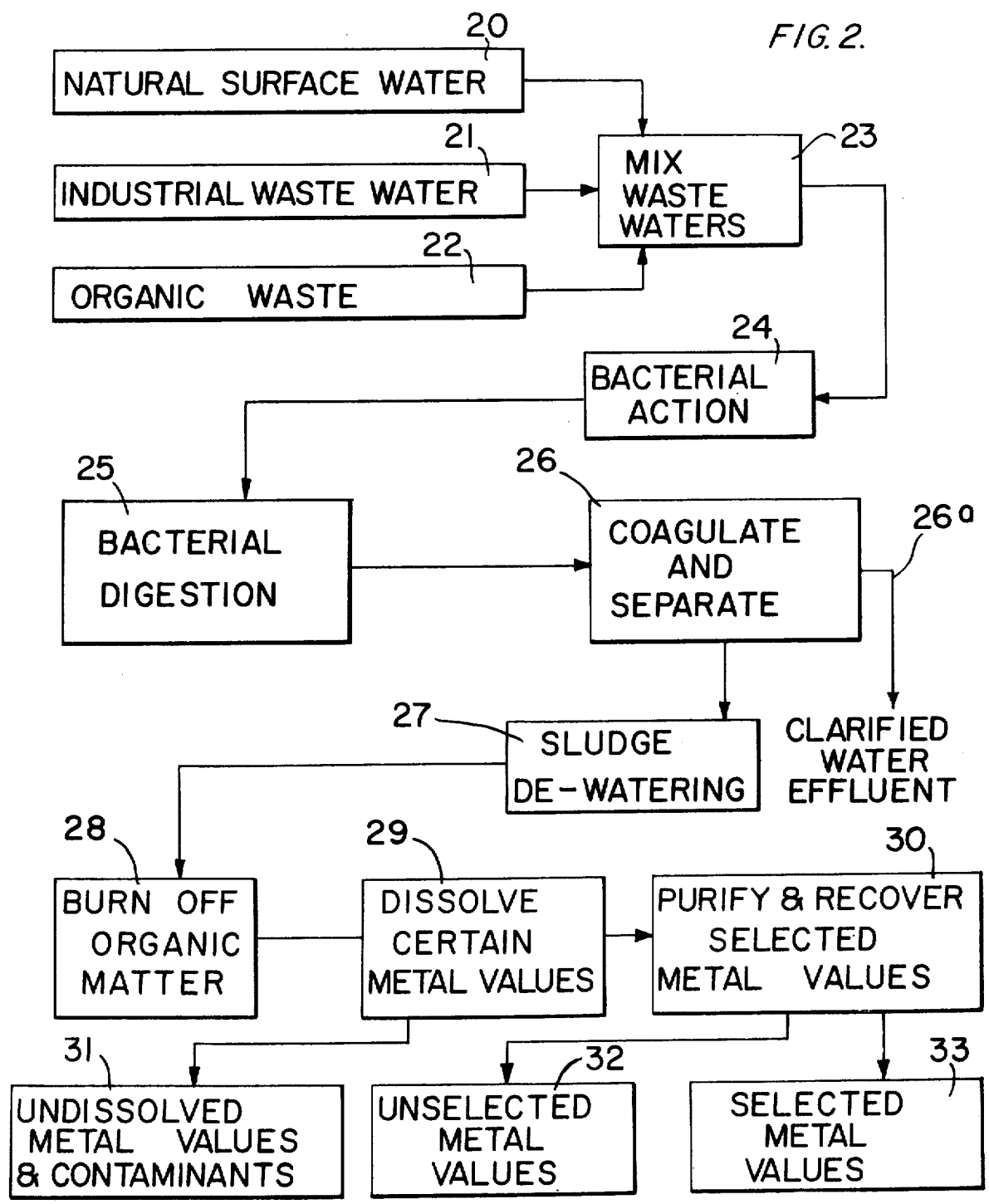

PROCESS FOR RECOVERY OF SELECTED METAL VALUES FROM WASTE WATERS

This is a continuation-in-part of my application, Ser. No. 622,783, filed Oct. 15, 1975, now abandoned.

FIELD OF INVENTION

This invention relates to a process for recovering selected metal values from waste waters using sewage type bacteria to imbibe and capture and concentrate the metal values in a sludge, followed by de-watering and burning off the sludge to eliminate organic matter and to further concentrate the metal values, and then treating by pyrometallurgical or hydrometallurgical steps to recover the desired metals.

BACKGROUND AND PRIOR ART

It has been common knowledge for many years that traces of gold, silver, platinum and other valuable metals are found in natural waters such as sea water and fresh water lakes and streams, and that these traces are present together with considerably larger quantities of other non-precious metals such as silicon, iron, magnesium and copper. U.S. Pat. No. 2,086,384 to Lady discusses the chemical recovery of these metals which are found in natural waters. U.S. Pat. No. 3,819,363 to Wanzenberg suggests a process for the recovery of precious metals from the sediment in sea water, the precious metal taking the form of organometallic precious metal values wich are contained in organic underwater deposits on the surface of inorganic materials such as sand, pebbles or shells, hereinafter referred to as debris, which is dredged and then treated according to the Wanzenberg process. The steps in that process include detaching the organic phase from the inorganic debris by treating with benzene, and then recovering the organic materials by floating them as a froth to separate them from the inorganic debris which sinks. The recovered organic froth is then chemically oxidized to spontaneously combust organic components leaving the metallic values, which are subsequently treated by metal-winning steps of a conventional nature.

The present disclosure differs from the Wanzenberg process because the present disclosure teaches steps which do not appear in the Wanzenberg process, and because the Wanzenberg process relies upon steps that would be inoperative in the presently disclosed process. In the present disclosure active bacteria is initially introduced to imbibe, concentrate, and immobilize, metal values to remove them from the waste waters wherein such metal values appear in very low concentrations, thereby capturing them in an organic phase.

Conversely, Wazenberg is not concerned with those precious metal values which are carried in the waters, and therefore his process does not teach a method for immobilizing these precious metal values and extracting them from the waters themselves. Instead, Wazenberg teaches a process for separation of a precious metal-bearing organic deposit from associated inorganic debris using benzene which serves the dual purpose of accomplishing detachment of the organic deposit or coating, and also of forming a buoyant froth in which the organic matter containing the metallic values is floated free from the debris and made easily recoverable from the water. Treatment of the Wanzenberg type with benzene applied to the mixed organic/inorganic sewage sludge which occurs at one stage in the steps of the present process was tried, but in the present process this Wanzenberg step was found to achieve no useful separation.

It is known that certain rather specialized bacteria can be used for the recovery of various metals including precious metals from mixtures containing them, U.S. Pat. No. 2,829,964 to Zimmerley appearing to be the first to suggest the use of such a biological process employing ferrooxidans for dissolving sulfide minerals and for changing ferrous sulfate to ferric sulfate. Certain other patents teach the use of ferrooxidans as oxidizing bacteria useful in the recovery of certain metals such as copper from solutions containing them, these patents including U.S. Pat. No. 3,252,756 to Goren; 3,266,889 to Duncan et al.; 3,305,353 to Duncan et al.; 3,347,661 to Mayling; 3,607,235 to Duncan et al.; and 3,679,397 to O'Connor et al.

Another strain of bacteria referred to as denitrificans is used in the recovery of other metals from salts as taught in U.S. Pat. Nos. 3,105,014 to Harrison and 3,272,621 to Zajic. Still another strain of bacteria known as thioxidan is discussed in U.S. Pat. No. 3,433,629 to Imai et al. and in U.S. Pat. No. 3,455,679 to Mayling. In each of these patents the process is essentially one of leaching to obtain selected metals in the form of other compounds which can be further treated.

However, none of these patents suggests the use of bacterial imbibing to capture metal values followed by burning off of the organic phase, for instance by incineration per se, or incident to smelting, to concentrate the metal bearing components.

There are other patents using biological treatment steps which are of interest in connection with the present subject matter since they involve the use of an activated sludge in the recovery of metals. U.S. Pat. No. 3,218,252 to Glover et al. teaches the use of an activated sludge process for the bacteriological oxidation of ferrous salts in an acid solution in which the bacteria is a ferrooxidan. The object in the Glover process is not to recover the iron per se, but to remove from mine waters metal compounds which are considered to be pollutants. The separation of the oxidized metal is accomplished by precipitation, after which part of the activated sludge is returned to the input stage of the process for recirculation with new mine waters being introduced thereinto. Thus, the metallic component can be separated from the organic component by precipitation because it can be differentiated by physical properties, the organic matter passing off with the treated mine waters.

Still another technique involves the recovery of silver from a solution containing silver halide, where the silver is in a gelatin, by using the step of fermentation of the gelatin in contact with an aerobic bacteria. An example of this process is U.S. Pat. No. 3,501,378 to Shinkai.

U.S. Pat. No. 3,537,986 to Watanabe et al. is a patent teaching the use of activated sludge to reduce the amount of coagulant needed to recover silver halide from a solution including gelatin by oxidizing and decomposing the gelatin, whereupon the silver halide is adsorbed on the sludge which is then precipitated, leaving supernatent liquid also containing unprecipitated silver halide. This patent contains no suggestion that bacterial action in waste waters would capture and immobilize precious metal values appearing in the waters in such dilute concentrations as to be unrecoverable by the use of coagulents. It contains no teaching of incineration in order to concentrate the metallic component, and it fails to teach the inorganic metal-winning steps which are required to achieve recovery of the precious metal values in the presence of much greater concentrations of the metallic values appearing as contaminants.

U.S. Pat. No. 3,755,530 to Avila et al. is not a biological process, but seeks to recover metals from plating solutions by a freeze-drying method which involves sublimation of the frozen solution followed by roasting of the dried agglomerates, the roasting serving the purpose of decomposing metallic salts, rather than serving the purpose of concentrating such salts by removal of organic flocculents with which the metal-bearing values are mixed as is the case in the present process.

Canadian Pat. No. 983,772, filed Aug. 31, 1972, in the name of Matyas Korosi and issued to Eastman Kodak Company teaches the recovery of silver from the waste waters of emulsion manufacture containing gelatin by treating the waters with a certain enzyme which reacts with the gelatin to form soluble peptides; then acid treating to effect precipitation of silver metal or compounds; then separating a concentrate of silver metal. The specification mentions incineration as a part of the silver recovery process.

With regard to treatment of the metal bearing ash to recover the desired metals therefrom, there are a great many prior art teachings including various different approaches, comprising pyrometallurgical and hydrometallurgical techniques which are typical of the metal-winning steps in the present process. These steps are of course non-biological and generally involve inorganic chemical recovery of the metals.

THE INVENTION

This invention is a process for the economic recovery of selected metal values from waste waters where the selected values appears in mere trace concentrations, for example of 0.1 to 500 parts per billion (PPB), which is lower than concentrations which have previously been considered commercially recoverable, i.e. economically feasible. This disclosure teaches that, in a bacterial system in which an activated sludge is separated from the water and then incinerated to burn off organic waste materials, the concentration factor of the trace metal values entering with the sewage and the water from the city water supply is up to about 40,000:1 when comparing the concentration of the metal values in influent waste water with the concentration in the ash of incinerated sludge. The present invention therefore couples the step of capturing and immobilizing the trace metals in a sludge, with the step of burning off the organic component and with the steps of a conventional metal-winning process to purify and recover captured selected metals, particularly precious metals. The efficiency of the combined process according to the present invention is such as to permit the economic recovery of precious metal values from waste waters which contain also a very wide variety of physically undifferentiated organic and inorganic matter, the latter including undesired metal values appearing as contaminants in the present process in much higher concentrations than the selected trace metal values, see EXAMPLE 1 below.

It is therefore a principal object of the invention to provide a process which uses bacterial action to capture and immobilize metal values in an organic sludge, burns off the organic matter by incineration either as a separate step or incident to a smelting step, and then uses inorganic metal-winning steps for purifying and recovering selected ones of the captured metal values. Although the present discussion is mainly concerned with gold and silver recovery, there are also significant quantities of copper, zinc, palladium, chromium, cadmium, nickel, tin and lead which appear with various other metallic oxides, such as calcium, aluminum, iron and magnesium. In some areas there is also a recoverable quantity of platinum and galium. The concentration of gold found in the inorganic matter recovered by the presently disclosed process can be as much as five times the concentration of gold in most of the commercial gold ore mined in the United States at the present time. The efficiency of concentration and recovery of the heavy metals from the influent is demonstrated further by the fact that there are no commercially significant quantities of these metals to be found in the effluent water leaving the present system.

Most prior art precious metal-winning processes fall into one of two general categories, i.e. the treatment of mineral ores, or the treatment of an industrial waste to recover a specific metal value such as the recovery of silver from waste waters from a photographic film manufacturing plant. In both of these cases, the precious metal value being recovered generally appears in concentrations of the order of, for example, 5–5000 parts per million, and usually it is not heavy contaminated by the presence of much higher concentrations of other metal values which will interfere with the recovery of the desired precious metal value.

These factors emphasize a major difference between such prior art teachings and the present invention, wherein the purpose of the present process is to recover precious metal values in useful amounts from the industrial and sanitary waste from a city where the precious metal values appear in mere trace concentrations of the order of 0.1 – 500 PPB, but wherein there are very many other metal values appearing in greater concentrations in the same waste waters, these other metal values tending to contaminate, and thereby impede efforts to recover the traces of precious metals. Both the amount and concentration of precious metal values vary from city to city, and therefore the economics of their recovery vary from one geographic location to another.

The main problems which the present invention solves are (1) how to concentrate mere trace quantities of precious metals appearing in very great quantities of waste waters, and (2) how to recover such precious metals when they appear in much higher concentrations of other base metals, and (3) how to achieve these objectives economically. This invention combines certain steps to achieve these purposes. The present process achieves a great total concentration enhancement while using ordinary bacteria of the type used for the bacterial treatment of sewage wherein the bacteria imbibes the sewage to concentrate the metal values into a separable sludge. These metal values in the sludge appear in the presence of vast amounts of organic material which are separated by incineration. The metal-winning steps set forth hereinafter recover almost all of the precious metal values in the waste waters despite heavy concentrations of base metals in wide variety. It is believed that when a concentration attributable to the bacterial step of about 10,000:1 to 40,000:1 is combined with the concentration attributable to the subsequent metal-winning steps, the total concentration is such as to make it possible to recover precious metals appearing in the waste waters as only a few parts per billion, this result being achieved virtually without loss of precious metal values in the original waste waters. The economics of this overall process are greatly improved by the fact that the sewage treatment portion of the process is being carried out for sanitation purposes already in many cities, whereby either dried sludge or incinerated ash is available as a byproduct.

THE DRAWING

FIG. 1 shows a block diagram illustrating apparatus suitable for carrying out the steps of a process according to the present invention; and FIG. 2 is a flow diagram illustrating the steps of the present process.

Referring now to FIG. 1 of the drawings, the waste waters contain metal values, the recovery of which is the purpose of the present process. These metals appear in waste waters which are represented by the block 1, these waters comprising, for instance, industrial waste water and natural surface water containing very dilute quantities of the various metals appearing as dissolved compounds. These waters enter the system having entrained therein organic waste of a type and quantity suitable to support the growth of bacteria. The source is generally a city sewage system. In a typical illustrative system, the influent including the organic waste, undergoes bacterial action represented by the block 2 before passing through a preliminary mixer and separator 3 designed to remove solids which can be made to precipitate immediately, and these solids are then delivered directly to a sludge de-watering device 4 which comprises any one of the several types which are well known in the sewage treatment art. In a more advanced type of sewage system the main stream of the influent passes from the preliminary separator 3 into a bacterial digestion chamber 6. These bacterial steps can be either aerobic or anaerobic. In the digestion chamber 6, in the case of aerobic bacterial treatment the mixture is aerated by a source of air 5. The activated sludge is circulated in the bacterial digestion chamber 6 for a protracted period of time, for instance, as set forth in EXAMPLE 1 below. The mixture is then separated in a separator 7 which delivers clarified water and concentrated sludge through separate outlets. This sludge which may typically be about 5% solids is also introduced into a sludge de-watering device 4 where it is mixed with the sludge from the preliminary separator 3. When de-watered, the sludge is about 16% solids by weight.

The diagram of FIG. 1 is a composite showing two flow routes which can be followed concurrently by the sewage, or alternatively. One route involves the mere mechanical separation of the sludge via the flow route 3a, and the other flow route involves the inclusion of bacterial digestion in the digester 6, either aerobic or anaerobic, followed by delivery to the dewatering device 4 by way of the route 7a. After the solid waste material has been de-watered in the sludge de-watering device 4, it can be delivered to an incinerator 8 where it is incinerated to an ash which as discharged is essentially devoid of organic material. The ash comprises compounds of the various metals, mostly oxides. The ash is represented by the block 9 on the diagram shown in FIG. 1, the ash comprising about 15 to 50% by weight of the sludge entering the incinerator if this sludge were dried. The ash is then subjected to selected inorganic metal-winning process steps represented by the block 10, illustrative examples of which are given hereinafter, which steps recover selected metals comprising the output of the process as represented by the block 11.

As an alternative process, the de-watered sludge from the block 4 can be mixed as indicated by the dashed line 4a with a base metal ore and smelted in the metal-winning step 10. In this case the incineration step 8 is omitted, and the organic matter in the sludge is burned off incident to smelting of the ore. For purposes of the present disclosure the word "ore" is defined to include not only a substantially untreated raw ore, but includes suitable intermediates resulting from prior treatment steps of the raw ore.

FIG. 2 shows the process of recovering selected metal values from waste waters which include natural surface water 20, industrial waste water 21, and organic waste 22, these waste waters being mixed together at 23 and being subject to bacterial action attributable to the presence of organic waste in the mixture, this bacterial action being indicated by the block 24.

In order to capture metal values which appear in these waste waters either in solution or in colloidal suspension, a bacterial digestion step 25 is used in which bacteria imbibe such metal values, thereby immobilizing them and concentrating them within the organic matter. The bacterial action which occurs in steps 24 and 25 can be aerobic and/or anaerobic. After a sufficient residence time, during which the bacterial imbibing of the metal values takes place, the mixture moves on to step 26 in which the sludge is coagulated and separated from the water, the water being drained off as shown at 26a, and the coagulated sludge being introduced into a de-watering step 27 where the percentage by weight of organic material is greatly increased.

The organic matter is then burned off in step 28, wherein the de-watered sludge is introduced for the purpose of eliminating organic matter and forming an ash comprising the metal values and any residual contaminants. This burning off step 28 may comprise either incineration of the sludge as a separate step, or alternatively it may occur incident to a smelting step wherein the sludge is mixed with an ore of a certain metal, selected metal values being thereby dissolved in step 29 in a melt of that certain metal. The undissolved metal values and contaminants are separated therefrom as shown in the block 31.

In the case where the burning off step 28 is accomplished by incineration to produce an ash, the ash is then subjected to subsequent inorganic metal-winning steps of the type illustrated in the specific EXAMPLES given below in this specification. The ash then passes to step 29 in which the metal-winning inorganic process steps are used to dissolve certain metal values which also include the selected metal values to be recovered. After certain metal values have been dissolved, the undissolved metal values and contaminants remain and are separated therefrom as shown in the block 31.

The dissolved metal values then pass to step 30 in which the mixture of dissolved values is purified in order to recover from all the dissolved metal values those which have been selected, i.e., by separating the selected values from the remaining dissolved metal values which are non-selected for purposes of the present process. The selected metal values are shown as the block 33 in FIG. 2, and the remaining metal values from which they were separated and recovered in step 30 are shown in a separate block 32.

EXAMPLE 1 — ORGANIC TREATMENT

The following discussion represents an illustrative example of organic process steps comprising the first portion of the present process, which organic steps are followed by inorganic metal-winning steps, examples of which are set forth below as EXAMPLES 2-6.

In this illustrative example, the influent mixed waste waters comprising natural surface water, industrial waste water, and organic waste, for instance sanitary waste, enter at a daily flow rate of about 28,000,000 gallons. The influent temperature is about 70° F with a pH of about 7. The influent contains a total solid content of about 500–1500 PPM, the precious metal content being, for silver about 20–100 PPB, for gold about 1–5 PP, and for platinum about 0.03–0.16 PPB. These precious metal values appear in the presence of very much higher relative quantities of baser metals, which for purposes of the subsequent metal-winning steps appear as contaminants.

In the bacterial treatment steps of the process, there is a residence time of from 3 to 24 hours during which the bacteria feed on the organic matter and imbibe the metal values, thereby immobilizing and concentrating them in a sludge, the temperature remaining at about 70° F and the pH remaining at about 7.

The sludge is then coagulated and separated to recover clarified water and wet sludge in which the total solid content has been increased to about 5% by weight. This wet sludge is then de-watered so that its total solid content is further increased to about 16% before incineration. However, where the sludge is to be added to an ore in a smelting step, as set forth for instance in Example 3 and 4 below, the sludge should be further de-watered or dried. In either event, the sludge is burned to drive off the organic matter. Where incineration is used to recover an ash, this ash comprises inorganic contaminants and metal values appearing about as follows: 20% $P_2O_5$; 5% $NO_3$; 7% $SiO_2$; 3.4Ca; 0.5% Mg; 48800 PPM Fe; 31600 PPM Al; 11400 PPM Zn; 10900 PPM Cu; 2180 PPM Cr; 1900 PPM Ni; 1450 PPM Pb; 472 PPM Mn; 300 PPM Ga; 190 PPM Cd; 600 PPM Ag; 30 PPM Au; 4 PPM Pd; 1 PPM Pt.; 10 PPM Tl.

From the point of view of physical characteristics the ash is a finely divided reddish powder with a density of about 40 pounds/cubic foot, wherein the above metallic values appear mostly as oxides which are physically dispersed and undifferentiated from each other in the mass. The ash is produced in quantities of about 8000 pounds per day, so that its concentration when compared with total influent is about 30,000:1. The effluent from the organic steps of the process comprises about 27,000,000 gallons of clarified water per day. The incineration is carried out with excess air during a residence time of about one-half hour and the ash leaves the incinerator at about 650° F.

When using one of the inorganic smelting processes set forth in the examples below the following results are obtainable:

Percentage of the gold and silver recovered — 90%.
Gold Production per day — 0.36 pounds — 5.25 Troy Ounces.
Silver Production per day — 3.6 pounds — 52.5 Troy Ounces.

The content of the incinerated ash will of course vary with the geographic area from which the waste waters are taken. The mineral content of the surface waters of that area constitute one variable, and the type of industry contributing to the industrial waste waters is another important variable.

There are various different metal-winning processes which can comprise the block 10 of FIG. 1 representing the inorganic steps required to recover one or more particular metals from the ash shown in the block 9. Among the commonest of these are various pyrometallurgical processes including smelting and/or sintering, and various hydrometallurgy processes, which represent two different approaches which can be used alternatively. The following examples are given to illustrate various inorganic metal-winning steps which are appropriate to use with the above organic sludge concentrating steps.

EXAMPLE 2 — PYROMETALLURGY

As an example of the pyrometallurgical approach, the incinerated ash from the block 9 in FIG. 1 of the drawing is mixed with copper ore and processed as follows: The mixture is smelted and separated into a valueless slag, and into a matte which is concentrated and contains the copper and other metal values including the precious metals. This matte is then further refined by preliminary fire refinement thereof and cast into copper bearing anodes.

The anodes are then subjected to an electrolytic refining step so that the anode is dissolved in the passage of current and is deposited in the form of a pure copper cathode within the electrolytic cell. The precious metals remain in the cell as a mud or slime which is recovered from the bottom of the cell and initially treated for the removal of remaining copper.

The mud is dried and fed into a furnace where it is further refined by oxidation of impurities into a slag. The precious metal remains in the form of a melt, often referred to as a dore, which is then cast into anodes for further electrolytic processing in a manner well known per se. If the platinum group of metals is also present, they will go along with the gold and can be separated from it by subsequent chemical or electrolytic means.

EXAMPLE 3 — COPPER SMELTING

Copper ore taken from a mine is first treated by well known flotation methods to concentrate the copper sulfide, and this concentrate is fed into a furnace together with incinerated ash, fluxed with various chemical reagents such as lime and silica. The furnace is maintained at a temperature of 1200° –1300° C for about two hours to bring about a two-phase separation comprising a low density siliceous slag and a high density matte containing copper sulfide and the precious metals from the ash dissolved therein. The slag has high affinity for iron and other contaminating base metals, while the matte is composed mainly of the copper sulfide and the dissolved precious metals. In the case of the sulfide ore, the furnace contains an $SO_2$ gas atmosphere.

The two-phase mass is easily separated into a black porous slag and a dense shiny metallic matte. The following data provides a breakdown for the chemical composition of the copper ore and the sanitary ash together with the flux:

|              | Ca   | Fe  | Cu   | Ag      | Au     |
|--------------|------|-----|------|---------|--------|
| Copper Ore   | 0.4% | 34% | 15%  | 18 PPM  | —      |
| Sanitary Ash | 7.8% | 2.9%| 0.2% | 146 PPM | 41 PPM |

The mixture contains about 81.8% Copper Ore; 8.2% Ash; 7.4% Silica and 2.5% Lime, and the resulting two-phase mass is about 71% matte and 29% slag by weight. Repeated refinement reduces the mass of the matte by further removal of remaining contaminants, principally iron.

The matte is then passed into another furnace which is maintained at 1200°–1300° C, and air is injected into it to supply oxygen. The sulfur is removed as $SO_2$, and after two hours a blister copper mass of about 95% purity is removed and cast into anodes. The anodes are then subjected to electrolysis to recover pure copper. The precious metal residue remains in the bottom of the plating tank as a slime or mud, and this mud is subsequently removed and converted in a small furnace by known process steps into pure precious metals. It is estimated (by analysis of the ash content) that about 81% of the silver and about 95% of the gold values are recovered by this process.

Considering further the case in which copper sulfide ore is used, dried sludge cannot be advantageously added to the substantially untreated raw ore, because usually there is an absence of a suitable oxidizing agent to burn off the organic matter in the initial smelting step. However, the dried sludge can be advantageously added to an intermediate resulting from such initial smelting and taking the form of a copper matte, for instance the matte described above. In this way the separate incineration step is eliminated, and additional furnace process heat is obtained from the burning off of the organic matter in the sludge coincident with the reaction of the sulfur in the copper sulfide with oxygen in air which is usually added in the furnace. The precious metals dissolve in the blister copper produced, and are recovered as discussed above.

However, if the ore is of the copper carbonate type then either ash or dried sludge can be mixed and smelted with the substantially untreated raw ore.

EXAMPLE 4 — LEAD SMELTING

This example is similar to Example 2, except that the sludge or ash from the incinerator is mixed with a lead ore. In this case, the gold, silver and copper which have been dissolved in the lead are extracted therefrom by the addition of zinc to the molten bath (PARKES' PROCESS). A zinc crust will form and will contain silver, gold and copper from the melt. This crust is recovered and further refined to separate the zinc by distillation. The zinc-free residue can then be separated for the recovery of copper, silver, and gold by chemical or electrolytic means.

The ability of lead to extract gold, silver and other precious metals from an ore is used in a procedure in which lead oxide is mixed with either the incinerator sewage ash, or with dried sludge containing the metal values in the ratio of about 3 to 5 parts of lead oxide to one part sludge or ash. Other compounds are added to the mixture, such as $SiO_2$, $Na_2CO_3$ and $Na_2B_4O_7$ to form a free-flowing, low-viscosity low-density slag through which the lead will easily settle out. If incinerated ash is used, it will be necessary to add a reducing agent to the mixture such as coke, or flour in laboratory work, to reduce the lead to metallic form. However, it is quite efficient to use dried sludge in the mixture instead of ash, the carbonaceous matter in the sludge replacing the reducing agent in the mixture. The dried sludge typically is in finely divided form and has a specific gravity of about 0.91 gm/cc, or 1500 lbs/cubic yard. Its moisture content typically is in the vicinity of 6%, and it contains about 50% combustible matter.

The mixture is then fused at 1000°–1050° C in a suitable container. The lead metal and slag phases separate, are cooled, and the slag is broken from the lead mass containing the precious metal values dissolved in it.

For lead smelting of ash having moderate amounts of base metal values, the following mixture and flux composition is satisfactory:

20 parts ash (gold content about 40 PPM, silver about 140 PPM in the ash)
60 parts PbO
5 parts $Na_2B_4O_7$
3 parts Flour For lead smelting of an ash having high amounts of base metal values, the mixture including the flux composition is changed to:

20 parts ash (gold content about 40 PPM, silver about 140 PPM in the ash)
90 parts PbO
60 parts $Na_2CO_3$
30 parts $Na_2B_4O_7$
8 parts $CaF_2$
15 parts $SiO_2$
7 parts Flour For lead smelting of a dried sludge:

20 parts dried sludge (gold content about 20 PPM, silver about 70 PPM in the sludge)
10–20 parts $SiO_2$
100–120 parts PbO
10–50 parts $Na_2CO_3$
20 parts $Na_2B_4O_7$ These proportions are adjusted to optimize the slag depending upon the behaviour of the ash, or sludge plus the lead ore.

The gold and silver and any other precious metal values contained in the lead mass are then recovered by standard techniques, such as by the Parkes' Process.

EXAMPLE 5 — HYDROMETALLURGY

In a typical method according to the hydrometallurgical approach, the incinerator ash can be treated by cyanidation. According to this approach, the ash is treated with a cyanide solution for dissolving the precious metals. The undissolved portion of the ash is then removed from the solution by filtration. The solid material is washed to recover any remaining noble metal-bearing solution, and this wash is added to the separated cyanide solution. The cyanide solution is then precipitated, for instance, using zinc or aluminum dust in the precipitation step, the precipitate then being refined to recover gold and silver in metallic form.

EXAMPLE 6 — CYANIDE EXTRACTION

As mentioned above, the incinerated ash containing the precious metal values also contains large percentages of base metals which are undesirable in cyanide extraction because they consume large amounts of the cyanide. Moreover, the cyanide forms complexes with the base metals as well as with the precious metals and these complexes tend also to be removed along with the selected precious metal values from the cyanide bath, whereby the desired isolation of precious metal values is defeated. Therefore, acid leaching of the base metal values using concentrated $H_2SO_4$ is employed as a pretreatment step to leach out active base metal values before cyanidation of the remaining ash. As a practical process, three or more acid baths are prepared in different vessels. The pH of the baths is maintained below 2.5, and the ash is removed from bath to bath at about 24-hour intervals in such a way that the weakest acid bath receives the untreated ash, and then the ash and/or the acid is moved to the next vessel for another 24 hours, so that with each move, the increasingly leached ash encounters a more concentrated acid. At the end of three days, this pretreatment is concluded and the remaining ash is ready for cyanidation, the base metal values having been removed in solution with the spent acid, and the precious metal values remaining in the ash since they are not soluble to a significant extent in the sulfuric acid.

The acid bath can advantageously contain about 400 lbs of concentrated $H_2SO_4$ per ton of ash. About two tons of water are used to dilute each ton of concentrated $H_2SO_4$, the proportion being non-critical so long as there is sufficient water present to facilitate pumping of the bath and filtering out of the ash.

The leached ash, still containing the precious metal values, is washed. Its residual acid content is neutralized by the addition of 2% to 4% of the weight of the ash of hydrated lime to raise the pH of the bath and prevent the formation of hydrogen cyanide when the ash is subsequently moved to a cyanidation bath which is continuously stirred and aerated by bubbling air therethrough. The bath contains from 1% to 6% of the weight of the ash of sodium cyanide, together with the ash from the pretreatment step, and washed coconut charcoal to the extent of about one ton per thousand ounces of precious metal. For a cyanide concentration of about one lb. NaCN per 100 lbs of ash, over a period of 24 to 72 hours the silver recovery from the ash by adsorption onto the charcoal is between 85% and 90%, and the gold recovery is about 95%. The recovery is not much increased by further increasing the cyanide concentration.

The charcoal with the precious metal complexes adsorbed thereon is recovered from the bath and the metal values are separated, for instance by burning off the charcoal. The precious metals can then be purified by well known steps, for instance by electrolytic refining.

The present invention is not to be limited to the exact process shown in the drawing, for obviously changes can be made therein within the scope of the following claims:

I claim:

1. The process of recovering selected metal values from waste waters in which said selected metal values appear in low concentrations on the order of 0.1–500 PPB, comprising the steps of:
   a. mixing natural surface water, industrial waste water and organic waste together to form said waste waters;
   b. capturing metal values from said waste waters by bacterial imbibing of said values to immobilize and concentrate the values into organic matter;
   c. coagulating and de-watering said organic matter, thereby separating said organic matter as a sludge from the waste waters;
   d. burning off the de-watered sludge to eliminate organic matters and form an ash comprising metal values and residual contaminants;
   e. separating certain ones of said metal values including said selected values by dissolving them and removing them from said ash while leaving undissolved others of said metal values and said contaminants; and
   f. purifying said dissolved metal values to isolate and recover the selected metal values from said certain separated values.

2. The process as set forth in claim 1, wherein said capturing by bacterial imbibing step includes mixing the waste waters with a sludge activated with aerobic bacteria and aerating the mixed waste water and activated sludge to sustain growth of the bacteria.

3. The process as set forth in claim 1, wherein said capturing by bacterial imbibing step includes mixing the waste waters with anaerobic bacteria.

4. The process as set forth in claim 1, wherein said separating and purifying steps comprise pyrometallurgical metal-winning techniques including smelting of the ash with the ore of a base metal to obtain an impure mass of the base metal in which said selected metal values are dissolved; and refining said mass to obtain therefrom selected metal values.

5. The process as set forth in claim 4, wherein the mass is refined and formed into an anode; the anode is electrolytically separated into a pure metal cathode and a mud containing precious metals; and the mud is further refined to recover the precious metals.

6. The process as set forth in claim 1, wherein said separating and purifying steps comprise pyrometallurgical metal-winning techniques including the steps of mixing the ash with copper sulfide ore; smelting the mixture to obtain a dissolved metal matte; and refining said matte to obtain therefrom selected metal values.

7. The process as set forth in claim 6, wherein the matte is refined and formed into an anode; the anode is electrolytically separated into a pure copper cathode and a mud containing precious metals; and the mud is further refined to recover the precious metals.

8. The process as set forth in claim 1, wherein said separating and purifying steps comprise pyrometallurgical metal-winning techniques including the steps of mixing the ash with lead oxide ore; smelting the mixture to obtain a lead mass in which said metal values are dissolved; refining said mass by the addition of zinc to form a zinc crust containing said metal values; and further refining the crust to recover the precious metals therefrom.

9. The process as set forth in claim 1, wherein some of the metal values appear as cyanicides, the step of removing said cyanicides from the ash, and wherein said separating and purifying step comprises hydrometallurgical metal-winning techniques including cyanidation of the ash; separation of dissolved metal values from undissolved metal values; and precipitation of selected dissolved metal values from the cyanide solution.

10. The process as set forth in claim 9, wherein said cyanide solution includes dissolved compounds of precious metals, and said metals are precipitated from the cyanide solution by adding dust of a selected non-precious metal to the solution.

11. The process of recovering precious metal values from waste waters including natural water, industrial waste water and organic waste where the precious metal values appear in very low concentrations, comprising the steps of:
   a. coagulating and separating solid matter as a sludge from the waste waters;
   b. de-watering the sludge;
   c. mixing the de-watered sludge with an ore of a base metal selected from the group copper and lead;
   d. smelting the mixed ore and sludge, wherein the organic matter in the sludge reduces the ore to produce a mass of the base metal containing the precious metal values; and
   e. refining the mass to recover selected precious metals therefrom.

12. The process as set forth in claim 11, including the additional step of treating said waste waters by bacterial digestion prior to said coagulating and separating step.

13. The process as set forth in claim 12, wherein said bacterial treatment step includes mixing the waste waters with a sludge activated with aerobic bacteria and aerating the mixed waste waters and activated sludge to sustain growth of the bacteria.

14. The process as set forth in claim 12, wherein said bacterial treatment includes mixing the waste waters with anaerobic bacteria.

15. The process as set forth in claim 11, wherein the mass is formed into an anode; the anode is electrolytically separated into a pure base metal cathode and a mud containing the precious metals; and the mud is further refined to recover the precious metals.

16. The process as set forth in claim 11, wherein said mixing step includes mixing the ash with lead oxide ore; and said refining step includes the addition of zinc to the mass to form a zinc crust containing said precious metal values, and refining the crust to recover the precious metals therefrom.

* * * * *